(12) United States Patent
Stavrinides

(10) Patent No.: US 10,910,807 B2
(45) Date of Patent: Feb. 2, 2021

(54) VEHICLE-MOUNTED BLOCK HEATER CORD EXTENDER WITH EXTENDABLE ARM AND WIRELESS WARNING UNIT

(71) Applicant: John Stavrinides, Regina (CA)

(72) Inventor: John Stavrinides, Regina (CA)

( * ) Notice: Subject to any disclaimer, the term of this patent is extended or adjusted under 35 U.S.C. 154(b) by 329 days.

(21) Appl. No.: 16/163,074

(22) Filed: Oct. 17, 2018

(65) Prior Publication Data

US 2019/0115741 A1     Apr. 18, 2019

Related U.S. Application Data

(60) Provisional application No. 62/573,977, filed on Oct. 18, 2017.

(51) Int. Cl.

| | | |
|---|---|---|
| *H02G 11/00* | (2006.01) | |
| *H02G 11/02* | (2006.01) | |
| *B60L 1/02* | (2006.01) | |
| *H01R 13/72* | (2006.01) | |
| *H01R 13/73* | (2006.01) | |
| *H01R 41/00* | (2006.01) | |
| *H01R 31/06* | (2006.01) | |
| *H01R 24/20* | (2011.01) | |
| *H01R 24/28* | (2011.01) | |

(52) U.S. Cl.
CPC ............ *H02G 11/006* (2013.01); *B60L 1/02* (2013.01); *H01R 13/72* (2013.01); *H01R 13/73* (2013.01); *H02G 11/02* (2013.01); *H01R 24/20* (2013.01); *H01R 24/28* (2013.01); *H01R 31/06* (2013.01); *H01R 41/00* (2013.01); *H01R 2201/26* (2013.01)

(58) Field of Classification Search
CPC ......... H02G 11/006; H02G 11/02; B60L 1/02; H01R 13/72; H01R 13/73; H01R 24/20; H01R 24/28; H01R 31/06; H01R 41/00; H01R 2201/26
See application file for complete search history.

(56) References Cited

U.S. PATENT DOCUMENTS

| | | | | |
|---|---|---|---|---|
| 6,109,229 A | * | 8/2000 | Pels .......................... | B60L 1/02 123/179.6 |
| 6,264,016 B1 | * | 7/2001 | Bales ...................... | B60R 11/02 191/12.4 |
| 6,854,575 B1 | * | 2/2005 | Desormeaux ........... | B60L 53/16 191/12.4 |
| 2001/0042741 A1 | * | 11/2001 | Ballem ..................... | H05B 3/56 219/205 |
| 2003/0038203 A1 | * | 2/2003 | Ohama .................. | H02G 11/02 242/385 |
| 2004/0266236 A1 | * | 12/2004 | Hughes ................... | B60R 19/48 439/152 |

(Continued)

*Primary Examiner* — Jason C Smith

(57) ABSTRACT

A block heater cord extender features a frame for mounting to a vehicle, a female electrical socket carried on the frame for receiving a male plug of the vehicle's block heater cord, and an extendable/retractable arm having a proximal end movably mounted to the frame. The arm is extendable and retractable in length, and carries an electrical plug at its distal end for mating with a mains power electrical outlet. Circuitry of the extender includes a wireless transmitter arranged activated by the mains power supply when the extender is plugged in. The transmitter sends a signal to a separate warning unit placed inside the vehicle, which reminds a vehicle operator to unplug the extender before driving away.

20 Claims, 3 Drawing Sheets

(56) References Cited

U.S. PATENT DOCUMENTS

2014/0027556 A1\* 1/2014 Christensen ........... H02G 11/02
                                                                                            242/378
2019/0115741 A1\* 4/2019 Stavrinides ............ H01R 13/73
2019/0217707 A1\* 7/2019 Reber ....................... B60L 5/02

\* cited by examiner

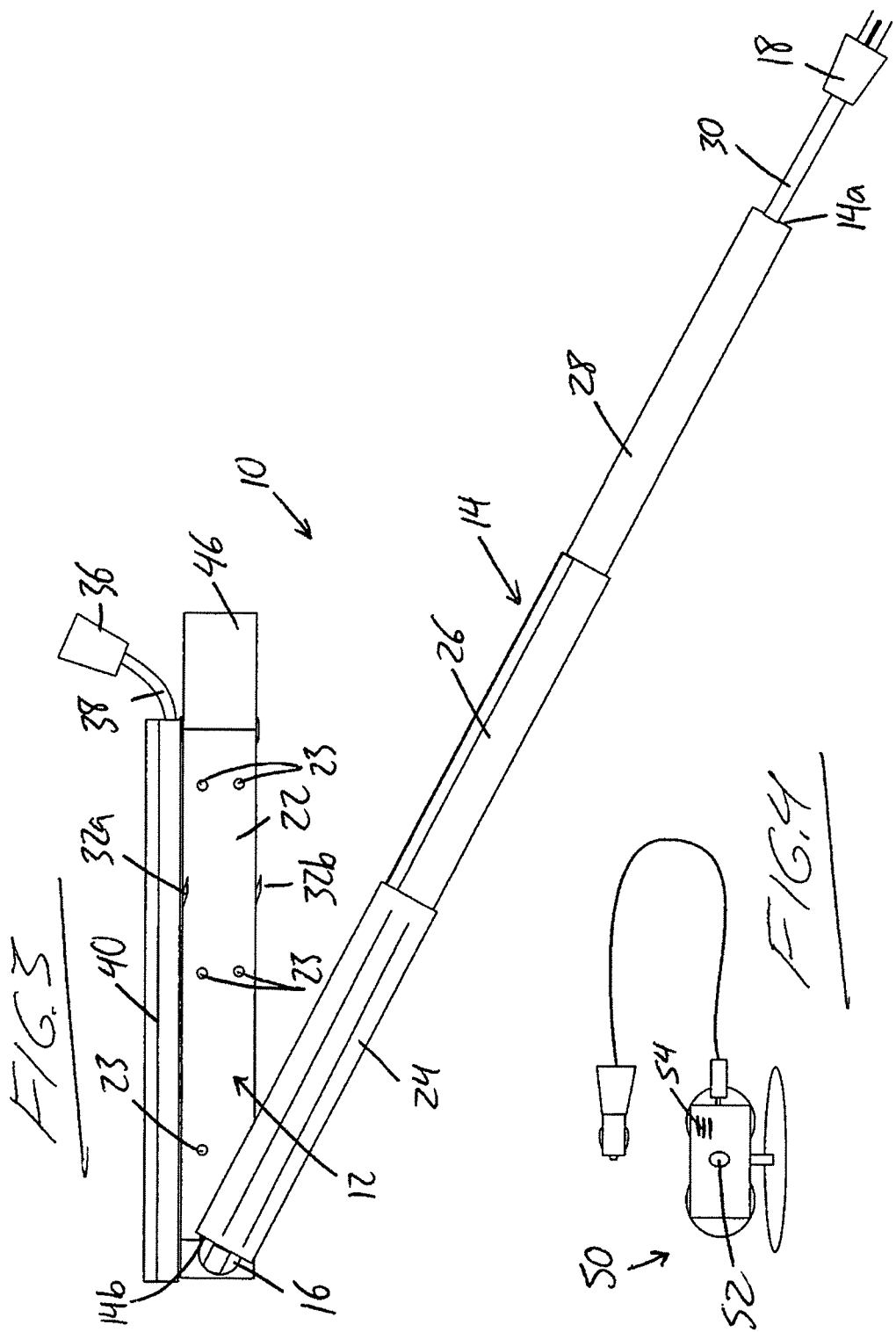

VEHICLE-MOUNTED BLOCK HEATER CORD EXTENDER WITH EXTENDABLE ARM AND WIRELESS WARNING UNIT

CROSS-REFERENCE TO RELATED APPLICATIONS

This application claims benefit under 35 U.S.C. 119(e) of U.S. Provisional Application No. 62/573,977, filed Oct. 18, 2017, the entirety of which is incorporated herein by reference.

FIELD OF THE INVENTION

The present invention relates generally to vehicle-mountable devices for extending the reach of a vehicle's block heater cord and eliminating the need to carry an extension cord in the vehicle and retrieve the cord from the vehicle cabin every time the block heater is used.

BACKGROUND

In cold climates, vehicle block heaters keep the engine warm and make the vehicle easier to start, thereby reducing stress on the battery, starter, and the engine itself. A standard block heater has only a short power cord intended to route the power plug of same to a location near the front end of the engine compartment, where a separate extension cord can be connected to extend the power cord to an electrical outlet of a mains power supply.

Historically, block heaters have been plugged into a power receptacle by retrieving an extension cord that is stored in the vehicle. Two hands are needed to first plug the block heater power cord into the extension cord, and then the extension cord into the mains power electrical outlet. This can be especially challenging in cold weather. Some drivers leave their block heater plugged into the extension cord, and wrap the extension cord around their side-view mirror, while others have mounted a coiling bracket on the front of their vehicle around which they manually wrap their extension cord manually to facilitate easier plugging in of their block heater.

Previously, it has been proposed to simplify the process by mounting a compact extension cord reel to an exterior of the vehicle and leaving the block heater power cord permanently plugged into the reel, so that an appropriate length of cord can be selectively deployed from the reel whenever needed, and later easily or automatically retracted once unplugged.

U.S. Pat. No. 5,803,216 discloses such a reel-based block heater cord solution, which further incorporates a timer function for automatic activation and deactivation of the block heater according to a programmed schedule.

U.S. Pat. No. 6,854,575 discloses another reel-based block heater cord solution, and incorporates a warning light to remind the user that the block heater is plugged in before driving away. However, the warning light is situated on the reel housing of the unit, which is externally mounted to the vehicle at a front license plate holder thereof, and therefore may be overlooked, particularly if the driver approaches the parked vehicle from the side or rear.

Despite the forgoing offerings in this field, there remains room for improvements or alternatives, and Applicant has designed a unique solution, the details of which are outlined in the following disclosure.

SUMMARY OF THE INVENTION

According to a first aspect of the invention, there is provided a block heater cord extender for connecting a power cord of a vehicle's block heater to an electrical outlet, said extender comprising:

a frame for mounting to the vehicle;

a female electrical socket carried on the frame for receiving a male plug of the power cord of the vehicle's block heater;

an arm having a proximal end movably mounted to the frame, and a distal end situated opposite the proximal end, the arm being extendable and retractable to expand and reduce an overall length of said arm between the proximal and distal ends thereof;

an electrical plug carried on the arm at or proximate the distal end thereof, said electrical plug being configured to mate with an electrical outlet of a mains power supply; and a circuit comprising electrical conductors connected between the female electrical socket and the electrical plug to enable transmission of power between the mains power supply and the block heater when the power cord of the vehicle's block heater is mated with the female electrical socket of the extender and the electrical plug of the extender is mated with the electrical outlet of the mains power supply.

Preferably the arm is movable between a storage position retracted against or adjacent the frame and a deployed position reaching outwardly from the frame.

Preferably the arm is pivotable about two different axes for both elevational and lateral positional adjustment of the arm, by which a user can aim the distal end of the arm toward the electrical outlet of the mains power supply.

Preferably the electrical plug is carried on the arm by a flexible cord.

Preferably said flexible cord is extendable and retractable from the distal end of the arm.

Preferably said flexible cord carries a pair of electrical contacts at an internal end thereof disposed inside a hollow interior of the arm, and the conductors comprise a pair of conductive strips defined within the hollow interior of the arm along which the pair of electrical contacts are slidable under pulling or pushing of the flexible cord from or back into the hollow interior of the arm.

Preferably the arm comprises multiple sections engaged together in a sliding manner for sliding extension and retraction of the sections relative to one another in a longitudinal direction of the arm, and the electrical conductors comprise, for each pair of adjacent sections, a conductive strip lying in the longitudinal direction on one of said adjacent sections and a respective electrical contact carried on the other of said adjacent sections in sliding contact with said conductive strip.

Preferably the electrical conductors comprise, for said each pair of adjacent sections, a second conductive strip on said one of the adjacent sections, and a second electrical contact and said other of the adjacent sections.

Preferably both of said conductive strips are defined on opposing surfaces of said one of said adjacent sections, and both of said conductive contacts project from opposite sides of the other of said adjacent sections.

Preferably each conductive strip is recessed in a groove.

Preferably each conductive strip is located internally of said one of said adjacent sections.

Preferably there are arm supports projecting from the frame to support the arm when stowed against or adjacent the frame.

Preferably the arm comprises a plurality of telescopically mated sections by which telescopic collapse and extension of said sections adjusts the overall length of the arm.

Preferably there is provided a separate warning unit for placement inside the vehicle, wherein the circuit comprises a wireless transmitter arranged to be activated by the mains power supply when the electrical plug is connected thereto, and the separate warning unit comprises a wireless receiver for receiving an output signal from the wireless transmitter, and a warning indicator activated by receipt of said output signal to warn a vehicle operator that the block heater cord extender is plugged into said mains power supply.

According to a second aspect of the invention, there is provided a block heater cord extension system for connecting a power cord of a vehicle's block heater to an electrical outlet, said system comprising:

a block heater cord extender comprising:
a frame for mounting to the vehicle;
a female electrical socket carried on the frame for receiving a male plug of the power cord of the vehicle's block heater;
an extendable/retractable extension carried by the frame;
an electrical plug carried on the extension and configured to mate with an electrical outlet of a mains power supply;
a circuit comprising electrical conductors connected between the female electrical socket and the electrical plug through the extendable/retractable extension to enable transmission of power between the mains power supply and the block heater when the power cord of the vehicle's block heater is mated with the female electrical socket of the extender and the electrical plug of the extender is mated with the electrical outlet of the mains power supply; and
a wireless transmitter installed in the circuit for activation by the mains power supply when the electrical plug is connected to said mains power supply; and
a separate warning unit for placement inside the vehicle and comprising a wireless receiver for receiving an output signal from the wireless transmitter when activated, and at least one warning indicator activated by receipt of said output signal to warn a vehicle operator that the block heater cord extender is plugged into said mains power supply.

Said at least one warning indicator may comprises an indicator light.

Additionally or alternatively, said at least one warning indicator may comprise an audible alarm.

BRIEF DESCRIPTION OF THE DRAWINGS

One embodiment of the invention will now be described in conjunction with the accompanying drawings in which:

FIG. 3 is a front elevational view of the block heater cord extender of FIG. 2 with the extendable/retractable arm thereof in a deployed and extended position.

FIG. 4 is an elevational view of a separate warning unit for informing a driver when the block heater cord extender is plugged into a mains power electrical outlet.

DETAILED DESCRIPTION

Figure 1:
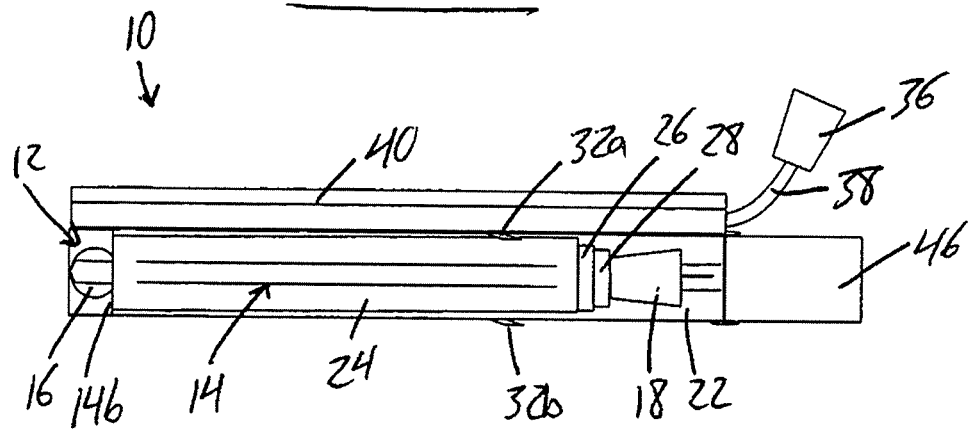
FIG. 1 is a front elevational view of a block heater cord extender according to the present invention with an extendable/retractable arm thereof in a collapsed and stowed position.

The block heater cord extender 10 illustrated in the accompanying drawings features a frame 12 mountable to the exterior of a vehicle, and a telescopically extendable/retractable arm 14 coupled to the frame by a multi-directional joint 16 by which the arm 14 can swing laterally toward and away from the frame about an upright pivot axis, and also elevationally upward and downward relative to the frame in order to point the lateral arm in any of a number of different directions from the frame. Together with longitudinal extension/retraction capabilities of the telescopic arm, this enables a user to move a distal end 14a of the arm anywhere within a notable range of three dimensional space in front of the frame in order to aim the distal end 14a of the arm toward an electrical outlet of a mains power supply so that an electrical plug 18 carried on the arm 14 near the distal end 14a thereof can be mated with the electrical outlet to convey power to a vehicle's block heater cord via the extender 10.

In the illustrated example, the frame 12 is defined entirely or substantially by a rectangular mounting plate 22 of horizontally elongated shape with a set of fastening holes 23 therein at distributed locations over its surface area. Through these holes 23, the mounting plate can be fastened to a suitable surface of the vehicle's exterior, typically to a front bumper or license plate holder of the vehicle so as to reside near the front engine compartment where the block heater resides. The installed frame would thus lie horizontally cross-wise to the vehicle along the front bumper thereof. The multi-directional joint 16, which in the illustrated example is a ball-and-socket joint, is mounted to the frame 12 adjacent one end of the horizontally elongated frame, and carries a first tubular section 24 of the telescopic arm. The arm of the illustrated embodiment features a second and intermediate tubular section 26 that is of smaller cross-sectional size and is slidably received within the interior of the first tubular section 24. A third and final tubular section 28 of the illustrated embodiment defines the distal end 14a of the arm 14 and is of even smaller cross-sectional area, and is slidably received within the interior of the intermediate tubular section 26. It will be appreciated that the number of telescopically mated sections within the arm may vary within the scope of the present invention.

The electrical plug 18 of the extender 10 is carried on the final tubular section 28 by a flexible cord 30 that has an internal end received inside the final tubular section 28. An external end of the flexible cord 30 carries the electrical plug outside the telescopic arm 14 beyond the distal end 14a thereof. In the illustrated embodiment, the distance by which the flexible cord 30 extends from the final tubular section 28 of the arm 14 is adjustable. Adjustment of the cord's projecting distance form the distal end of the arm is performed by pulling on the electrical plug 18 in order to draw it further outward from the arm, or pushing on the plug or the externally exposed portion of the flexible cord to displace more of the cord back into the final section of the arm.

In a fully collapsed state of the arm 14, with an entirety or near entirety of the intermediate section 26 retracted inside the first section 24 and an entirety or near entirety of the final section 28 retracted inside the intermediate section 24, the overall length of the arm between its joint-mounted proximal end 14b and its opposing cord-carrying distal end 14a is shorter in length than the mounting plate 22 of the frame 12. With the flexible cord 30 also fully retracted into the final section 28 of the arm 14, thus holding the electrical plug 18 against the distal end 14a of the arm, the combined length of the arm, cord and plug from the joint-mounted proximal end 14b of the arm 14 to the blade tips of the electrical plug 18 is also shorter in length than the mounting plate of the frame 12, as shown in FIG. 1.

Arm support tabs 32a, 32b project from the mounting plate 22 of the frame 12 on the same side thereof at which the arm 14 is mounted by the joint 16 in order to stabilize the arm 14 when in a stowed position against or closely adjacent the mounting plate when the extender is not in use. The illustrated example includes upper and lower support tabs 32a, 32b situated above and below the stowed arm 14 to respective block upward and downwardly swinging of the arm 14 from its stowed position lying horizontally along the frame in paralleled relation to the mounting plate thereof. Each support tab 32a, 32b may be a resilient snap tab with a catch at the outer end thereof for hooking over the top or bottom edge of a front face of the first tubular section 24, whereby the support tabs 32a, 32b also block lateral swinging of the arm 14 out its stowed position against or closely adjacent the mounting plate 22 of the frame.

A female electrical socket 36 is mounted to the end of another flexible cord 38 that is partially received in a cord housing 40, which in turn is affixed to the mounting plate 22 of the frame, for example in a position running along a top edge thereof. The female electrical socket 36 resides outside of the cord housing 40 so as to be accessible to the compatible male plug of a block heater power cord. In the illustrated example, the cord 38 extends from the housing 40 at a distal end thereof situated furthest from the multi-directional joint 16 that carries the arm 14. From the female electrical socket 36, the cord 38 extends through the housing 40 and then transitions from the housing 40 into the first tubular section 24 of the arm 24, for example through the multi-directional joint. This cord 38 has a length that exceeds the minimum length required to reach the first tubular section 24 of the arm through the housing 40, and this excess cord length is contained within the housing 40 in the illustrated example, where only a short fractional length of the cord reaches externally from the distal end of the housing 40 to carry the female socket 36. During installation of the extender, an installer can thus select how much of the excess cord length to pull out from the housing 40 based on the length of cord 38 required to reach from the installed position of the housing 40 on the vehicle to the male plug of the vehicle's block heater power cord. In one embodiment, cord 38 is at least 3-feet long. In the summer, the power plug of the block heater cord can be disengaged from the female socket 36, and the excess cord 38 can be tucked into the housing 40 for tidy storage.

Electrical communication between the female socket 36 and the electrical plug 18 is provided by a set of cooperating conductors, which include the internal wires of the two flexible cords 30, 38 and also a plurality of slidingly mated strips and contacts found within the telescopically mated arm sections 24, 26, 28.

Figure 5:
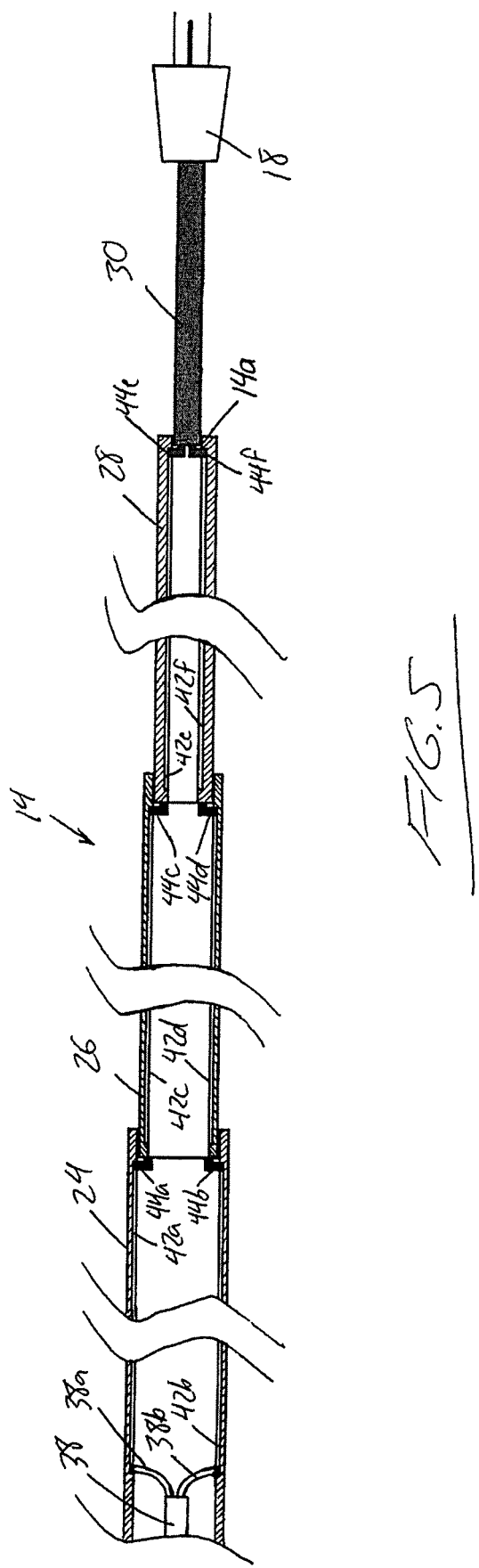
FIG. 5 is a cross-sectional view of the extendable/retractable arm of the block heater cord extender of FIG. 3.

With reference to the cross-section of FIG. 5, the first tubular section 24 features two conductive strips 42a, 42b respectively lining a pair of longitudinal grooves defined in opposing internal wall surfaces of the first tubular section 24. An inner end of the intermediate tubular section 26 situated inside the first tubular section 24 carries a pair of electrical contacts 44a, 44b that project outwardly beyond the periphery of the intermediate section 26 to ride within the longitudinal grooves of the first tubular section 24 in sliding contact with the conductive strips 42a, 42b thereof. Likewise, the intermediate tubular section 26 features two conductive strips 42c, 42d respectively lining a pair of longitudinal grooves defined in opposing internal wall surfaces of the intermediate tubular section 26. An inner end of the final tubular section 28 situated inside the intermediate tubular section 26 carries a pair of electrical contacts 44c, 44d that project outwardly beyond the periphery of the final section 28 to ride within the longitudinal grooves of the intermediate tubular section 26 in sliding contact with the conductive strips 42c, 42d thereof. The final tubular section 28 also features two conductive strips 42e, 42f respectively lining a pair of longitudinal grooves defined in opposing internal wall surfaces of the final tubular section 28. The inner end of the flexible cord 30 situated inside the final tubular section 28 carries a pair of electrical contacts 44e, 44f that project outwardly beyond the periphery of the flexible cord 30 to ride within the longitudinal grooves of the final tubular section in sliding contact with the conductive strips 42e, 42f thereof.

The hot and neutral wires 38a, 38b inside flexible cord 38 are respectively connected to the conductive strips 42a, 42b of the first tubular section 24 of the arm, and the hot and neutral wires inside flexible cord 30 are respectively connected to the conductive contact pads 44e, 44f, whereby the hot wires of the two flexible cords 30, 38 are connected by hot side conductive strips and contacts 42a, 44a, 42c, 44c, 42e, 44e and the neutral wires of the two flexible cords 30, 38 are connected by neutral side conductive strips and contacts 42b, 44b, 42d, 44d, 42f, 44f. Though not revealed in the cross-section of FIG. 5, for example due to positioning on the cut-away walls of the tubular sections, a third conductive strip is preferably provided inside each tubular section 24, 26, 28 and slidingly mated with a respective third contact pad on the next tubular 26, 28 section or cable 30. The ground wire of the cord 18 is connected to the third conductive trip of the first tubular section 24. This third set of mating strips and contact pads provides a conductive ground path from the ground pin of the electrical plug 18 to the ground wire of the cord 18. This establishes electrical communication between the ground pin of the electrical plug 18 and the ground socket contact of the female electrical socket 36 in order to allow grounding of the block heater cord.

Plugging of the male plug of a vehicle's block heater cord into the extender's female socket 36 and plugging of the extender's electrical plug 18 into an electrical outlet of a mains power supply will thus form a closed circuit between the mains power supply and the block heater to provide power thereto. The block heater cord is plugged into the extender's female socket 36 once, and then any time use of the block heater is required, the user simply one-handedly swings the extendable/retractable arm 14 out from its stowed position against the mounting plate 22 of the frame 12 and points the distal end 14a toward the nearest mains power electrical outlet. With the arm deployed out from its storage position, the user pulls the electrical plug 18 of the extender toward the mains power electrical outlet, thereby extending the plug 18 slightly from the arm 14 via the extendable cord 30 and also extending the telescopic arm until sufficient arm length is achieved from the joint 16 to mate the electrical plug 18 with the mains power socket and thereby energize the block heater. To de-energize the block heater when use of the vehicle is again required, the reverse action can simply be performed on a similar one-handed basis, by pulling the electrical plug 18 out from the mains power electrical socket, and pushing the electrical plug 18 or distal end 14a of the arm 14 back toward the joint-carried proximal end 14b of the arm to telescopically collapse the arm and the arm-carried cord 30. The collapsed arm is then swung back into its stowed position against or closely adjacent the frame 12.

Using the extender of the present invention, there's no need for retrieval of the cord from the vehicle interior, for unwinding or unraveling of a coiled or tangled extension cord, or for two-handed mating of an extension cord with the block heater power cord followed by a separate plugging of the extension cord into to the mains power electrical outlet.

The illustrated embodiment includes a plug protecting cover 46 hinged to the mounting plate 22 of the frame 12 at the distal end thereof opposite the arm-carrying joint 16. The cover 46 is movable between the illustrated open position reaching longitudinally outward from this distal end of the mounting plate 22 in generally parallel relation thereto, and a closed position at least partially concealing the electrical plug 18 when the arm 14 is in the stowed position.

Figure 2:
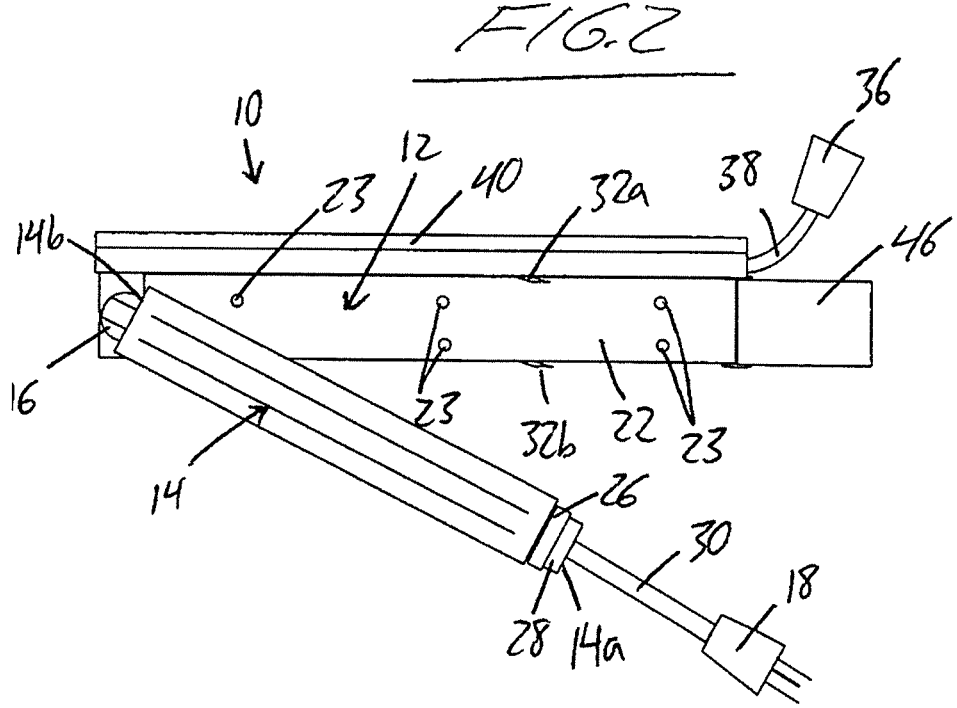
FIG. 2 is a front elevational view of the block heater cord extender of FIG. 1 with the extendable/retractable arm thereof in a deployed, but still collapsed, position.

FIG. 4 shows an optional warning unit 48 that is separate from the main extender unit shown in FIGS. 1 to 3. The warning unit 48 is to be placed within the interior passenger cabin of the vehicle to provide a driver with a warning signal when the electrical plug 18 of the main extender unit 10 is plugged into a mains power electrical outlet. In embodiments including this warning unit 48, the main extender unit features a wireless transmitter, for example wired within the same conductive circuit of the extender through which the block heater is energized so that the wireless transmitter is likewise powered by the mains power supply when the extender is plugged into the mains power electrical outlet. When activated by such connection to the mains power supply, the transmitter sends a wireless signal to the warning unit 50 inside the passenger cabin of the vehicle, in response to which the warning unit activates a warning indicator, such as a warning light 52 and/or audible warning alarm 54. This way, the driver is reminded that the block heater extender is still plugged in before they inadvertently drive away from the mains power socket, and risk damage to the extender and/or the vehicle.

The warning unit 50 may be powered by a dedicated on-board battery, e.g. lithium battery, but in the illustrated embodiment is instead powered by the vehicle's electrical system, for example by way of a male 12V connector 52 configured to mate with a 12V auxiliary power outlet of the vehicle. Alternatively, the warning unit 50 may include a USB cable compatible with 5V USB ports commonly found on modern vehicles. The warning unit may come with one or more suction cup mounts for coupling to a windshield, window, dashboard or other smooth flat surface inside the vehicle's passenger cabin.

Some vehicles are configured to provide power through auxiliary power ports only when the vehicle's ignition is on, in which case added benefit is realized by the fact that the warning unit 50 only draws power once the vehicle is started up, and thus does not drain the vehicle battery unnecessarily at times when driver-detectable warning of the vehicle's plugged in status is unnecessary. By using wireless transmission of the warning signal, the warning indicator can be located inside the vehicle where it is most likely to be noticed by the driver, and yet routing of wires between the vehicle's passenger cabin and the extender's exterior mounting location is avoided.

In the alternate scenario where the warning unit relies on a dedicated battery rather than the vehicle for power, the warning unit preferably incorporates a low-battery warning indicator. This may take the form of another warning light, preferably of a different illuminated colour than the main warning light 52 to ensure distinction between the two. LEDs are preferably used as the warning lights to minimize energy consumption by the warning unit.

In addition to the wireless warning functionality, the extender may also incorporate a timer function by which a user can program a time delay function. Such functionality enables use of the extender in a time-delay mode in which the block heater is only energized after a selected period of time has elapsed from when the extender is plugged into the mains power electrical outlet. In one embodiment, the user can program or select between delay periods ranging between zero and twelve hours. Selection or programming of a "zero" time delay interval operates the extender in an "always on" mode rather than in the time-delay mode. In embodiments employing both the warning and timer functionality, meaning that the block heater is not necessarily energized at any given time despite a plugged in status with the mains power electrical outlet, the transmitter may be arranged to always transmit regardless of whether the timer has energized the block heater branch of the circuit. This way, the driver is warned of the plugged-in status of the extender regardless of the energized or de-energized status of the block heater, as controlled by the timer.

It will be appreciated that the novel use of an externally mounted block heater cord extender with a separate internally located alarm unit need not necessarily be limited to a telescopic-arm extender of the type shown in described herein, as the unique wireless warning unit 50 of the present invention could likewise be paired with a coil-based or reel-based block heater cord extender in which the extendable/retractable extension of the block heater's power cord is a coiled or reel-mounted extension cord, rather than a telescopically extendable arm.

Since various modifications can be made in my invention as herein above described, and many apparently widely different embodiments of same made, it is intended that all matter contained in the accompanying specification shall be interpreted as illustrative only and not in a limiting sense.

The invention claimed is:
1. A block heater cord extender for connecting a power cord of a vehicle's block heater to an electrical outlet, said extender comprising:
   a frame for mounting to the vehicle;
   a female electrical socket carried on the frame for receiving a male plug of the power cord of the vehicle's block heater;
   an extendable/retractable arm having a proximal end movably mounted to the frame, and a distal end situated opposite the proximal end, the arm being extendable and retractable to expand and reduce an overall length of said arm between the proximal and distal ends thereof;
   an electrical plug carried on the arm at or proximate the distal end thereof, said electrical plug being configured to mate with an electrical outlet of a mains power supply; and
   a circuit comprising electrical conductors connected between the female electrical socket and the electrical plug to enable transmission of power between the mains power supply and the block heater when the power cord of the vehicle's block heater is mated with the female electrical socket of the extender and the electrical plug of the extender is mated with the electrical outlet of the mains power supply.

2. The block heater cord extender of claim 1 wherein the arm is movable between a storage position retracted against or adjacent the frame and a deployed position reaching outwardly from the frame.

3. The block heater cord extender of claim 1 wherein the arm is pivotable about two different axes for both elevational and lateral positional adjustment of the arm, by which a user can aim the distal end of the arm toward the electrical outlet of the mains power supply.

4. The block heater cord extender of claim 1 wherein the electrical plug is carried on the arm by a flexible cord.

5. The block heater cord extender of claim 4 wherein said flexible cord is extendable and retractable from the distal end of the arm.

6. The block heater cord extender of claim 5 wherein said flexible cord carries a pair of electrical contacts at an internal end thereof disposed inside a hollow interior of the arm, and the conductors comprise a pair of conductive strips defined within the hollow interior of the arm along which the pair of electrical contacts are slidable under pulling or pushing of the flexible cord from or back into the hollow interior of the arm.

7. The block heater cord extender of claim 1 wherein the arm comprises multiple sections engaged together in a sliding manner for sliding extension and retraction of the sections relative to one another in a longitudinal direction of the arm, and the electrical conductors comprise, for each pair of adjacent sections, a conductive strip lying in the longitudinal direction on one of said adjacent sections and a respective electrical contact carried on the other of said adjacent sections in sliding contact with said conductive strip.

8. The block heater cord extender of claim 7 wherein the electrical conductors comprise, for said each pair of adjacent sections, a second conductive strip on said one of the adjacent sections, and a second electrical contact and said other of the adjacent sections.

9. The block heater of claim 8 wherein said flexible cord is extendable and retractable from the distal end of the retractable arm, and the conductors comprise another pair of electrical contacts carried by the flexible cord at an internal end thereof disposed inside a terminal telescopic section of the arm that defines the distal end thereof, and another pair of conductive strips that are defined within the terminal telescopic section and along which said another pair of electrical contacts are slidable under pulling or pushing of the flexible cord from or back into the last telescopic section.

10. The block heater cord extender of claim 8 wherein each conductive strip is located internally of said one of said adjacent sections.

11. The block heater cord extender of claim 8 wherein both of said conductive strips are defined on opposing surfaces of said one of said adjacent sections, and both of said conductive contacts project from opposite sides of the other of said adjacent sections.

12. The block heater cord extender of claim 7 wherein each conductive strip is recessed in a groove.

13. The block heater cord extender of claim 1 comprising arm supports projecting from the frame to support the arm when stowed against or adjacent the frame.

14. The block heater cord extender of claim 1 wherein the arm comprises a plurality of telescopically mated sections by which telescopic collapse and extension of said sections adjusts the overall length of the arm.

15. The block heater cord extender of claim 1 in combination with a separate warning unit for placement inside the vehicle, wherein the circuit comprises a wireless transmitter arranged to be activated by the mains power supply when the electrical plug is connected thereto, and the separate warning unit comprises a wireless receiver for receiving an output signal from the wireless transmitter, and a warning indicator activated by receipt of said output signal to warn a vehicle operator that the block heater cord extender is plugged into said mains power supply.

16. The block heater cord extender of claim 15 wherein said at least one warning indicator comprises an indicator light.

17. The block heater cord extender of claim 15 wherein said at least one warning indicator comprises an audible alarm.

18. A block heater cord extension system for connecting a power cord of a vehicle's block heater to an electrical outlet, said system comprising:

a block heater cord extender comprising:

a frame for mounting to the vehicle;

a female electrical socket carried on the frame for receiving a male plug of the power cord of the vehicle's block heater;

an extendable/retractable extension carried by the frame;

an electrical plug carried on the extension and configured to mate with an electrical outlet of a mains power supply;

a circuit comprising electrical conductors connected between the female electrical socket and the electrical plug through the extendable/retractable extension to enable transmission of power between the mains power supply and the block heater when the power cord of the vehicle's block heater is mated with the female electrical socket of the extender and the electrical plug of the extender is mated with the electrical outlet of the mains power supply; and a wireless transmitter installed in the circuit for activation by the mains power supply when the electrical plug is connected to said mains power supply; and a separate warning unit for placement inside the vehicle and comprising a wireless receiver for receiving an output signal from the wireless transmitter when activated, and at least one warning indicator activated by receipt of said output signal to warn a vehicle operator that the block heater cord extender is plugged into said mains power supply.

19. The block heater cord extender of claim 18 wherein said at least one warning indicator comprises an indicator light.

20. The block heater cord extender of claim 18 wherein said at least one warning indicator comprises an audible alarm.

* * * * *